United States Patent [19]
Brody

[11] Patent Number: 4,925,128
[45] Date of Patent: May 15, 1990

[54] SPOUT FOR SQUEEZE BOTTLE
[75] Inventor: Harvey Brody, Costa Mesa, Calif.
[73] Assignee: Norvey, Inc., Santa Ana, Calif.
[21] Appl. No.: 243,153
[22] Filed: Sep. 9, 1988

Related U.S. Application Data
[63] Continuation of Ser. No. 41,858, Apr. 22, 1987, abandoned.

[51] Int. Cl.$^5$ ............................................. B65D 37/00
[52] U.S. Cl. ................................. 222/211; 222/464; 264/328.1; 425/577
[58] Field of Search ............... 222/211, 206, 464, 526, 222/538, 530; 264/328.1, 328.9; 425/577

[56]  References Cited
U.S. PATENT DOCUMENTS

| | | | |
|---|---|---|---|
| D. 200,364 | 2/1965 | Brody | D58/26 |
| 3,100,068 | 8/1963 | Kersten | 222/211 |
| 3,127,064 | 3/1964 | Fairchild | 222/464 |
| 4,603,831 | 8/1986 | Kzldnakamar et al. | 425/577 |
| 4,781,573 | 11/1988 | Depreter | 425/577 |

FOREIGN PATENT DOCUMENTS 881807 10/1958 United Kingdom ................ 222/211

Primary Examiner—Joseph J. Rolla
Assistant Examiner—Kenneth Noland
Attorney, Agent, or Firm—Klein & Szekeres

[57]  ABSTRACT

An improved spout assembly for a squeeze bottle or the like includes an extensible dispensing tube slidably disposed in an elongated, hollow cap member, with the distal end of the tube extending from an orifice at the tip of the cap member. The tube is extensible from the cap member to a selected extended position. The cap member has an improved structure which includes a plurality of discrete, spaced-apart, rib-like bearing elements extending radially inwardly from the interior wall surface of the cap near the tip. The bearing elements frictionally engage the extensible tube so as to maintain the tube in a selected position. The cap member is made of injection-molded plastic formed in a novel mold assembly comprising a solid core and a hollow cavity. The core has a cylindrical plug extending axially from its tip. The plug snugly seats in a socket at the bottom of the cavity. When molten plastic is injected into the gap between the core and the walls of the cavity, the cap is formed with an orifice created around the juncture between the plug and the socket.

7 Claims, 2 Drawing Sheets

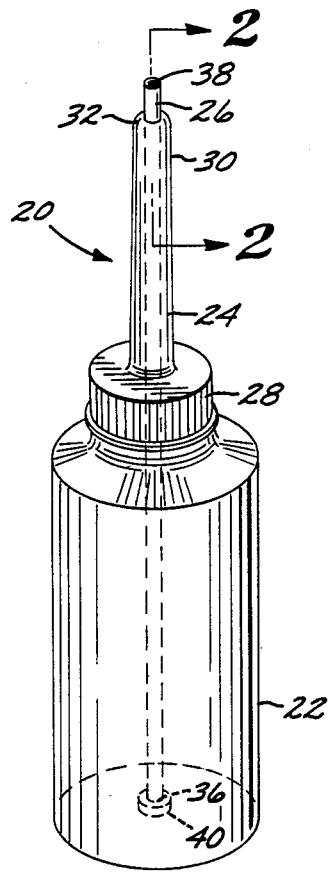
FIG. 1
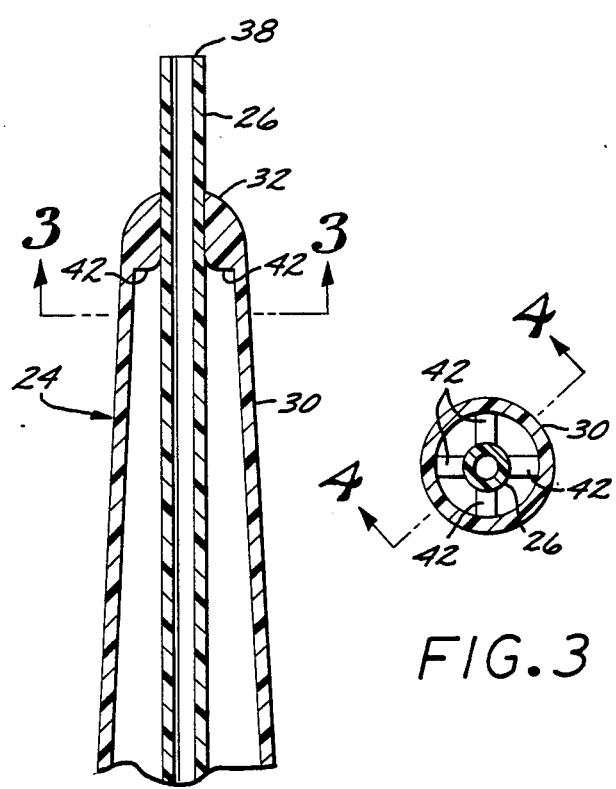
FIG. 2
FIG. 3
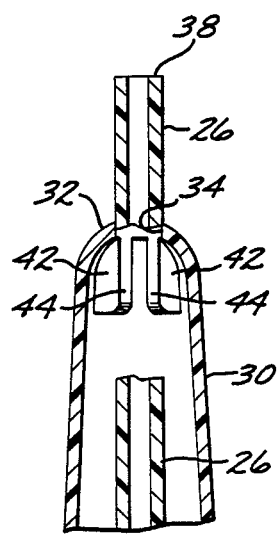
FIG. 4
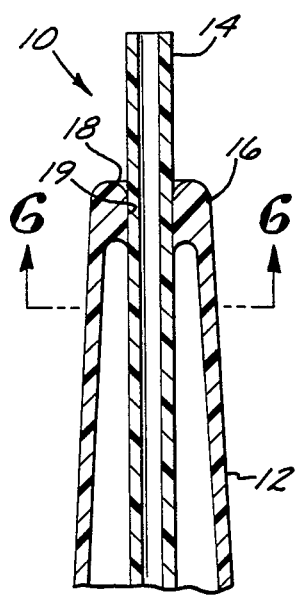
FIG. 5
PRIOR ART
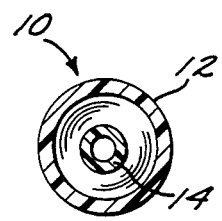
FIG. 6
PRIOR ART

SPOUT FOR SQUEEZE BOTTLE

This application is a continuation of co-pending application Ser. No. 041,858; filed Apr. 22, 1987; now abandoned.

Background of the Invention

This invention relates generally to the field of dispensers for liquids, of the category commonly known as "squeeze bottles". More particularly, the present invention relates to a novel spout assembly for a squeeze bottle.

Squeeze bottles are very well known and code in a wide variety of configurations for a great many different applications. One particular type of squeeze bottle has become quite popular for dispensing lubricating oils and the like. This type of squeeze bottle has an elongated, hollow cap that accommodates a long, hollow, flexible tube that is normally retained within the bottle with just its outermost end portion extending from the opening at the tip of the cap. When it is desired to dispense the contents of the bottle, the tube is extended through the cap to form an elongate flexible spout, thereby allowing the contents to be dispensed into small orifices and other relatively inaccessible places. An example of such an extensible-spout squeeze bottle is disclosed in U.S. Design Patent No. Des. 200,364.

The internal structure of the spout assembly of this prior art extensible-spout squeeze bottle is illustrated in FIGS. 5 and 6 of the drawings accompanying the present specification. As illustrated, the prior art spout assembly 10 comprises an elongated, hollow cap 12 (only the distal portion of which is shown), which receives an elongate, hollow, flexible dispensing tube 14 (also shown only partially) The cap 12 has a relatively thick-walled tip 16 having a central passage terminating in a recessed orifice 18. The tube 14 is carried in this passage and extends from the orifice 18. The inner surface of the tip wall surrounding the passage frictionally engages the tube 14 with an interference fit, as best shown in FIG. 5, forming a bearing surface 19. The engagement between the tube 14 and the bearing surface 19 causes the tube 14 to stay in a selected extended position until it is pushed back through the cap into its retracted position. The bearing surface 19 also provides a seal between the tube 14 and the cap 12.

One drawback of this structure is that it is difficult to manufacture economically by the injection molding process while maintaining consistently high quality control. Specifically, the internal structure of the cap dictates the use of mold elements that are subject to rapid wear, thereby necessitating frequent repair and replacement of these elements if properly-functioning parts are to be made.

For example, the mold elements used to make this prior art structure comprise a male element, or "core", and a female element, or "cavity", with the walls of the cap being formed by injecting molten plastic in the space between the core and the cavity. The orifice is formed by inserting a retractable, cylndrical rod or pin into a socket at the tip of the core, thereby forming a hole in the material at the tip of the cap. As the pin wears, a build-up of flash can occur inside the orifice. In addition, the misalignment or the bending of the pin can result in an off-center or irregularly-shaped orifice. Also, any irregularity in the pin's orientation or configuration, due to wear, stress, or the like, can result in irregularities in the bearing surface 19, with consequent deterioration of the seal around the tube In addition, as is well-known in the injection-molding art, uniformity in mass-produced parts is difficult to achieve where the parts have walls of varying thickness, as is the case with the tip of the prior art cap. Moreover, the relatively thin metal of the core around the socket at its tip is susceptible to damage.

In use, the prior art cap structure also exhibits some shortcomings, particularly in the durability of the seal provided by the bearing surface 19, and in the degree of support for the tube within the cap.

Consequently, there has been a long-felt, but as yet unsatisfied, need for a spout assembly that allows for highly-automated manufacturing techniques with consistently high quality control and uniformity in mass production, while providing good wear characteristics and durability even after long-term use.

SUMMARY OF THE INVENTION

Broadly, the present invention is an improved extensible spout assembly, wherein the improvement comprises a plurality of discrete, spaced-apart, rib-like bearing elements, integral with, and extending radially inwardly from the interior wall surface of the cap near its tip. More specifically, a preferred embodiment of the invention includes four such bearing elements equidistantly spaced around the interior wall surface of the cap. Each of the bearing elements extends proximally (i.e., away from the tip the cap) from the cap wall surface surrounding the at the distal end of the tip through which the tube emerges. The cap wall surface around the orifice in the tip is dimensioned for sealing engagement the exterior surface of the tube.

As will be better appreciated from the detailed which follows, the present invention provides multiple bearing surfaces that provide good wear characteristics, and which allow the tube to be maintained in a selected extended position with good stability. Moreover, good sealing around the tube is maintained by the engagement of the cap wall surface around the opening with the exterior surface of the tube.

These advantageous characteristics are achieved with a spout assembly structure that is simple and economical to manufacture by a novel improvement in the injection molding apparatus, using mold components that do not exhibit the fragility of those needed to make the prior art devices. This improved molding apparatus, which is also a part of the present invention, may briefly be described as follows: A core is provided that conforms to the internal configuration of the cap, but with a cylindrical plug extending axially from the tip. The plug snugly seats in a socket formed at the innermost point (i.e., the bottom) of the cavity when the core is inserted into the cavity prior to the injection of the molten plastic. When the core is inserted into the cavity with the plug seated in the socket, a gap is formed between the core and the cavity, except at the juncture of the plug and the socket, at which point the orifice in the tip of the cap is formed. Radial indentations near the tip of the core form the aforementioned bearing elements.

Thus, the novel molding apparatus eliminates the troublesome retractable pin of the prior art, allows the use of a solid core that is less prone to damage, and minimizes the variance in wall thickness between the tip of the cap and the rest of its length. These advantages, in turn, allow the molding process to be more highly automated, with less down-time for the repair and replacement of mold elements, thereby yielding a consistently high level of quality in the finished products.

BRIEF DESCRIPTION OF THE DRAWINGS

FIG. 1 is a perspective view of a squeeze bottle with an extensible spout assembly in accordance with the present invention;

FIG. 2 is a cross-sectional view along line 2—2 of FIG. 1;

FIG. 3 is a cross-sectional view along line 3—3 of FIG. 2;

FIG. 4 is a cross-sectional view along line 4—4 of FIG. 3, with the extensible tube partially broken away;

FIG. 5 is a detailed cross-sectional view of a prior art extensible spout assembly, as discussed above;

FIG. 6 is a cross-sectional view along line 6—6 of FIG. 5;

DETAILED DESCRIPTION OF THE INVENTION

Figure 7:
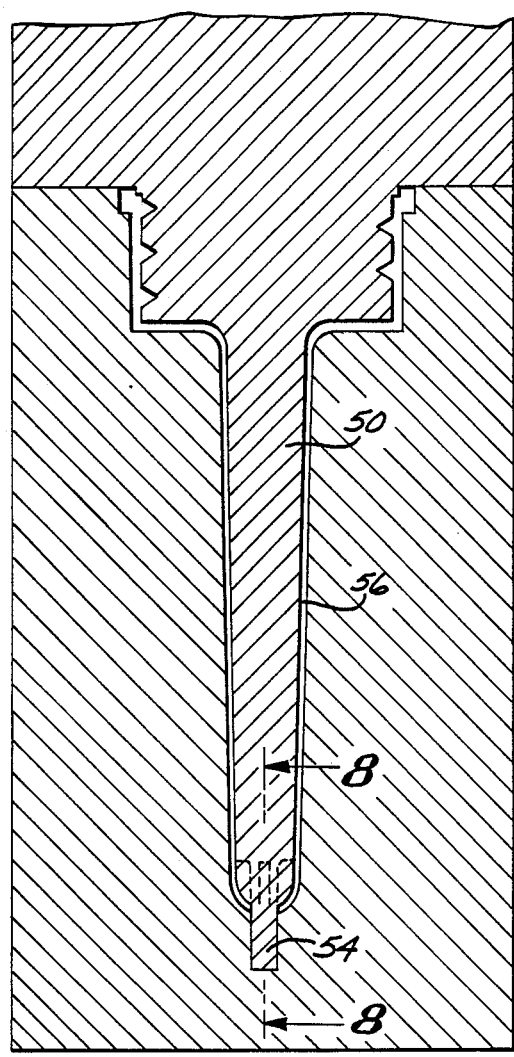
FIG. 7 is a simplified cross-sectional view of the 4 injection mold elements used to form the spout assembly of FIGS. 1 through 4.

1. The Spout Assembly of FIGS. 1 Through 4

As shown in FIG. 1, an extensible spout assembly 20, in accordance with a preferred embodiment of the present invention, is attached to a typical squeeze bottle 22. The extensible spout assembly comprises a cap 24 and an extensible dispensing tube 26. The cap 24 has a proximal end that is formed as an internally-threaded fitting 28 that screws onto an externally-threaded neck (not shown) bottle 22, as is well known. Extending distally (upwardly in the drawings) from the fitting 28 is an elongate, hollow extension 30 terminating in a rounded distal tip 32 with a central orifice 34 (FIG. 4). The tube 26 has an inner or proximal end 36 and an outer or distal end 38. A peripheral flange 40 is provided at the proximal end 36.

When the tube 26 is in the retracted position shown in FIG. 1, its proximal end 36 rests near the bottom of the bottle 22, while its distal end 38 extends through the orifice 34. When it is desired to dispense the contents of the bottle, the distal end 38 of the tube 26 is pulled outwardly from the orifice 34 to the desired extended position. The flange 40 provides a stop against the interior of the fitting 28, so that the tube cannot be completely removed from the bottle.

The novel aspects of the present invention are most clearly shown in FIGS. 2, 3, and 4. These figures show the interior of the cap extension 30 near the tip 32, where there are located several (preferably four) rib-like bearing elements 42 integral with, and extending radially inwardly from, the interior wall surface of the cap extension. As best shown in FIG. 3, the bearing elements 42 are preferably equidistantly spaced around the interior wall surface of the cap extension 30, and they are dimensioned to engage the exterior surface of the tube 26. Thus, as best shown in FIG. 4, the bearing members 42 define a plurality evenly-spaced bearing surfaces 44 that slidably engage the exterior surface of the tube 26 with sufficient friction to maintain the tube in a selected extended position. The bearing surfaces 44 provide an even distribution of the frictional forces among the four bearing elements 42, while also providing sufficient surface area to minimize excessive wear at any particular point.

The orifice 34 at the tip 3 of the cap extension 30 is dimensioned to receive the tube 26 with a slidable interference fit. Accordingly, the wall surface surrounding the orifice 34 provides an additional multi-point bearing surface, while also effecting a substantially fluid-tight seal around the tube.

2. The Injection Molding Apparatus and Method: FIGS. 7 Through 10

Referring now to FIGS. 7 through 10, the novel injection-molding apparatus and method used to make the above-described spout assembly can now be explained.

Figure 8:
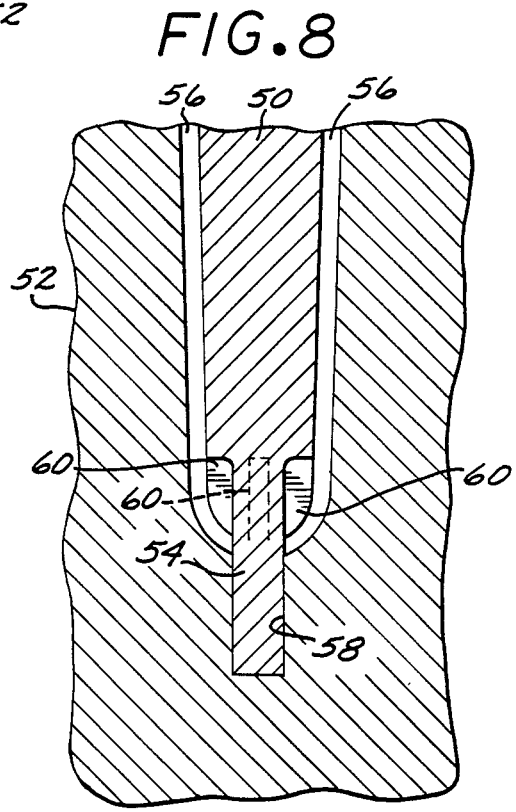
FIG. 8 is an enlarged cross-sectional view along line 8—8 of FIG. 7.
Figure 9:
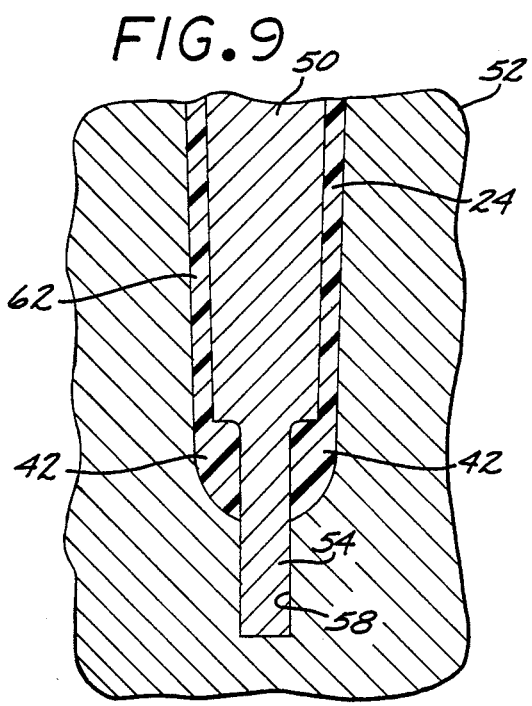
FIG. 9 is a view similar to that of FIG. 8, but showing the mold elements after molten plastic has been injected between them.

As best shown in FIGS. 7 and 8, the injection molding apparatus comprises two mold elements: a male element or core 50 and a female element or cavity 52. The core 50 is elongate and slightly tapered toward its distal end or tip, conforming to the interior configuration of the above-described cap 24, with the exception of a rod-like, cylindrical plug 54 extending axially from the distal end of the core. The cavity 52 is dimensioned to conform to the exterior configuration of the cap 24, and thus receives the core with a gap 56 formed between the core and the cavity, the gap 56 representing approximately the wall thickness of cap. There is no gap, however, around the plug 54, since the plug registers with, and snugly seats in, a socket 58 formed at the innermost point (i.e., the bottom) of the cavity 52.

The distal end of the core 50 has, in its preferred embodiment, four radial indentations or notches 60 equidistantly-spaced around the tip of the core. The notches 60 conform to the configuration of the above-described bearig elements 42.

The core 50 is removably received in the cavity 52, with the plug 54 seated in the socket 58, as described above When the core and the cavity are so mated, molten plastic material is injected into the gap 56, by conventional means, well-known in the injection molding art. This material, indicated by the numeral 62 in FIG. 9, fills the gap 56 and the notches 60, forming the walls of the cap 24 and the bearing elements 42.

Figure 10:
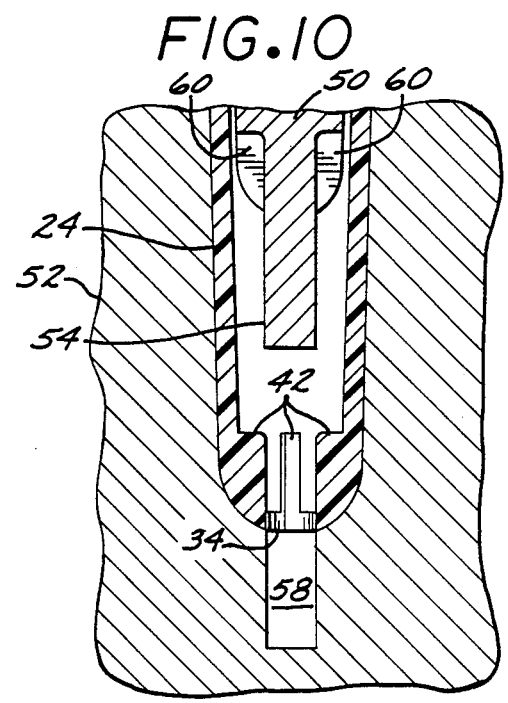
FIG. 10 is a view similar to that of FIG. 9, but showing the core being withdrawn from the cavity, leaving the injection molded cap.

Since no material can flow between the core and the cavity at the juncture of the plug 54 and the socket 58, the orifice 34 is formed around this juncture. This is best illustrated in FIG. 10, which shows the step of removing the core from the cavity after the plastic material 62 has hardened. Thus, in FIG. 10, the completed cap 24 (still in the cavity before removal for assembly with the tube 26) is shown with the orifice 34 formed where the juncture of the plug 54 and the socket 58 had been, with the rib-like bearing elements 42 (three of which are shown) being formed where the notches 60 of the core had been.

From the foregoing description, the previously-summarized advantages of the present invention can be readily appreciated. For example, as compared to the prior art spout assembly described above, the present invention provides a more positive and durable seal between the extensible tube 26 and the cap 24, due to multiple bearing surfaces 44 and the interference fit at the orifice 34. This structure also provides improved support and stability for the tube when it is extended. These characteristics are provided with a high degree of uniformity in mass production due to the novel design of the injection molding elements used to form the cap. The molding elements minimize the previously-described problems of misalignment, excessive wear, and susceptibility to damage that characterized the prior art molding process.

Specifically, by eliminating the retractable pin used to form the orifice in the prior art cap, the present invention avoids or minimizes the misalignment and wear problems that created irregularities in the sealing and bearing surfaces, as previously described. The result is a higher level of quality control than was achievable in the prior art, especially at the crucial sealing and bearing surfaces. Contributing also to this advantage is the use of a core in the present invention that is solid, rather than hollow, thereby decreasing the probability of premature wear or damage. Furthermore, by using mold elements that are inherently simpler and more durable than those of the prior art, less down-time is needed for repair and replacement, thereby lowering the cost of manufacture. Costs are further lowered by the less frequent need to discard parts ruined by the presence of flash in the molded cap structure. In addition, more rapid automation is enabled by the bearing elements 42, which act as guides for the insertion of the extensible tube into the cap, eliminating the need for the separate step of using a guide rod or pin for the insertion, as in the prior art.

In sum, the present invention provides a device that is functionally superior to the prior art, and yet which can be made to higher quality standards at a lower per-unit cost.

While a preferred embodiment of the invention has been described above, it will be appreciated that a number of variations and modifications will suggest themselves to those skilled in the pertinent arts. For example, the number of the bearing elements 42 can be varied from as few as three to eight, or more. Also, the configuration of the bearing elements may be varied from that shown and described herein.

These and other modifications which may suggest themselves are considered to be within the spirit and scope of the present invention, as defined in the claims which follow.

What is claimed is:

1. A process for making an improved cap member for an extensible-spout squeeze bottle, of the type in which the cap member has a distal trip with an orifice through which an extensible dispensing tube is slidably disposed, said process comprising the steps of:
    (1) providing an elongate male mold element with a cylindrical plug extending axially from the tip thereof, said male mold element further including a plurality of radial indentations near the tip thereof;
    (2) providing a female mold element having a socket at the innermost point thereof, said socket being located and dimensioned to receive said plug, said female mold element being dimensioned to receive said male mold element with a gap therebetween except for a juncture formed by the seating of said plug in said socket;
    (3) mating said male and female mold elements so that said plug is snugly seated in said socket;
    (4) injecting molten plastic into said gap so as to fill said indentations;
    (5) allowing said plastic to harden;
    (6) separating said male and female mold elements; and
    (7) removing said cap from said female mold element, said cap having a plurality of rib-like elements extending radially inwardly from the interior surface of said cap element, each of said rib-like elements being formed by one of said radial indentations in said male mold element and each of said rib-like elements being dimensioned to have a bearing surface that frictionally engages said dispensing tube when said dispensing tube is disposed in said cap for slidable movement through said orifice.

2. The process of claim 1, wherein said male mold element has at least three equidistantly-spaced indentations.

3. The process of claim 2, wherein said male mold element has four equidistantly-spaced indentations.

4. The process of claim 1, wherein said orifice is formed around the juncture of said plug and said socket when said plug is seated in said socket, said orifice being dimensioned for sealingly engaging said extensible dispensing tube when said tube is disposed in said orifice.

5. A spout assembly for a squeeze bottle or the like, of the type including an extensible dispensing tube slidably disposed in an elongated hollow cap member, the distal end of the tube extending from the cap member to a selectable extended position, wherein the improvement comprises:
    first and second bearing means, integral with, and extending radially inwardly from, the interior wall surface of the cap member near the distal end thereof, for slidably engaging the exterior surface of the tube, whereby the engagement between the tube and the first and second bearing means maintains the tube in a selected extended position;
    the first bearing means comprising an annular bearing surface formed by the position of the interior wall surface surrounding the orifice, the annular bearing surface being dimensioned to provide and interference fit with the exterior surface of the tube, thereby forming a fluid-tight seal around the tube at the orifice; and
    the second bearing means comprising a plurality of spaced-apart, rib-like bearing elements extending radially inwardly from the interior wall surface and formed contiguously with the annular bearing surface.

6. The spout assembly of claim 5, wherein the second bearing means comprises at least three bearing elements spaced equidistantly around the interior wall surface.

7. The spout assembly of claim 6, wherein the cap member is formed from injection-molded plastic.

* * * * *

UNITED STATES PATENT AND TRADEMARK OFFICE
CERTIFICATE OF CORRECTION

PATENT NO. : 4,925,128

DATED : May 15, 1990

INVENTOR(S) : Harvey Brody

It is certified that error appears in the above-identified patent and that said Letters Patent is hereby corrected as shown below:

Column 1, line 14 "code" should be --come--;

Column 1, line 36, after "partially)" insert --.--;

Column 2, line 2, after "tube" insert --.--;

Column 2, line 30, after "tip" insert --of--;

Column 2, line 31, after "the" insert --orifice--;

Column 2, line 32, after "the" first instance, insert --extensible--;

Column 2, line 34, after "ment" insert --with--;

Column 2, line 35, after "detailed" insert --description--;

Column 3, line 40, after "shown)" insert --of the --;

Column 3, line 67, after "plurality" insert --of--;

Column 4, line 41, after "above" insert --.--;

Column 4, line 7, "3" should be --32--;

Column 6, line 44, "position" should be --portion--;

UNITED STATES PATENT AND TRADEMARK OFFICE
CERTIFICATE OF CORRECTION

PATENT NO. : 4,925,128

DATED : May 15, 1990

INVENTOR(S) : Harvey Brody

It is certified that error appears in the above-identified patent and that said Letters Patent is hereby corrected as shown below:

Column 6, line 46, "and" should be --an--.

Signed and Sealed this

Twenty-second Day of September, 1992

Attest:

DOUGLAS B. COMER

Attesting Officer     Acting Commissioner of Patents and Trademarks